(12) United States Patent
Lingvall et al.

(10) Patent No.: US 9,500,319 B2
(45) Date of Patent: Nov. 22, 2016

(54) FLOW MODULE PORT FITTING

(75) Inventors: Magnus Lingvall, Snäckvägen (SE); Kasper Hoglund, Ronninge (SE)

(73) Assignee: Alfa Laval Corporate AB, Lund (SE)

( * ) Notice: Subject to any disclaimer, the term of this patent is extended or adjusted under 35 U.S.C. 154(b) by 135 days.

(21) Appl. No.: 13/807,770

(22) PCT Filed: Jun. 29, 2011

(86) PCT No.: PCT/SE2011/050865
§ 371 (c)(1),
(2), (4) Date: Feb. 1, 2013

(87) PCT Pub. No.: WO2012/002892
PCT Pub. Date: Jan. 5, 2012

(65) Prior Publication Data
US 2013/0139905 A1 Jun. 6, 2013

(30) Foreign Application Priority Data
Jul. 1, 2010 (SE) .................... 10168141

(51) Int. Cl.
*F16L 55/11* (2006.01)
*F16L 15/04* (2006.01)
*F17D 1/00* (2006.01)

(52) U.S. Cl.
CPC ............. *F17D 1/00* (2013.01); *F16L 15/04* (2013.01); *F16L 55/1108* (2013.01); *Y10T 137/598* (2015.04)

(58) Field of Classification Search
CPC ............ F16L 15/04; F16L 55/1108; F17D 1/00; Y10T 137/598
USPC ......... 73/198, 201, 756; 374/141, 147, 208
See application file for complete search history.

(56) References Cited

U.S. PATENT DOCUMENTS

| | | | | |
|---|---|---|---|---|
| 3,040,579 A | * | 6/1962 | Taylor | 374/141 |
| 3,224,260 A | * | 12/1965 | Lankford | 73/756 |
| 4,182,184 A | * | 1/1980 | Bakalyar et al. | 73/864.87 |
| 4,638,668 A | * | 1/1987 | Leverberg et al. | 73/756 |
| 4,786,090 A | | 11/1988 | Mott | |
| 5,139,345 A | * | 8/1992 | Schafer et al. | 374/208 |
| 5,398,559 A | * | 3/1995 | Westlake et al. | 374/147 |

(Continued)

FOREIGN PATENT DOCUMENTS

| DE | 2425968 A1 | 12/1975 |
|---|---|---|
| DE | 3119681 A1 | 1/1983 |

(Continued)

*Primary Examiner* — Craig Schneider
*Assistant Examiner* — Josephine Trinidad-Borges
(74) *Attorney, Agent, or Firm* — MKG LLC (57) ABSTRACT

A flow module port fitting to be inserted in port hole in a flow module, which port hole is in communication with flow channel. The port fitting comprises a head, and a shaft with a center axis, attached to the head, wherein the shaft has a first and a second end portion, the port fitting comprises further a fastening element at its first end portion for fastening the port fitting to the flow module or flow plate. The port fitting comprises further a seal arranged either externally on said shaft or seal is arranged at the second end portion facing away from the head, or seal is arranged in the short side of said second end portion, wherein seal is sealing port hole together with port fitting from the fluids flowing in flow channel.

10 Claims, 4 Drawing Sheets

(56) References Cited

U.S. PATENT DOCUMENTS

| | | | |
|---|---|---|---|
| 5,535,629 A * | 7/1996 | Gerdes et al. | 73/756 |
| 5,667,306 A * | 9/1997 | Montreuil et al. | 374/208 |
| 5,829,880 A * | 11/1998 | Diedrich | 374/208 |
| 6,029,683 A | 2/2000 | Moebs et al. | |
| 6,273,478 B1 | 8/2001 | Benett et al. | |
| 7,036,983 B2 * | 5/2006 | Green et al. | 374/141 |
| 7,147,369 B2 * | 12/2006 | Gadonniex et al. | 374/208 |
| 7,468,165 B2 | 12/2008 | Oberbeck et al. | |
| 7,625,526 B2 | 12/2009 | van den Brink et al. | |
| 2006/0022458 A1 | 2/2006 | Droste et al. | |
| 2007/0283764 A1 * | 12/2007 | Tanner | 73/756 |
| 2009/0120940 A1 | 5/2009 | Shah | |

FOREIGN PATENT DOCUMENTS

| | | |
|---|---|---|
| DE | 10224114 A1 | 12/2003 |
| EP | 0679877 A1 | 11/1995 |
| EP | 1108467 A2 | 6/2001 |
| GB | 723209 A1 | 2/1955 |
| GB | 819092 A | 8/1959 |
| WO | 2007050013 A1 | 5/2007 |
| WO | 2007073281 A1 | 6/2007 |
| WO | 2010120234 A1 | 10/2010 |

* cited by examiner

FLOW MODULE PORT FITTING

TECHNICAL FIELD

The present invention relates to a flow module port fitting, and in particular to a flow module port fitting attachable to port holes in flow modules.

TECHNICAL BACKGROUND

Chemical reactors, which typically include flow modules, transport a continuous flow of materials or reactants into the reactor and a continuous flow of materials or products out of the reactor. Features such as flexibility in set-up, flow configuration, mixing properties, temperature control and monitoring, residence times, are typically considered in the design of flow modules.

A number of problems to overcome when designing and building multipurpose flow modules are, for example, leakage, enabling of visual inspection, blocking of ports, cleaning of flow paths, adaptation of process flow path to get desired residence time for a given flow rate, access to process flow in the middle of the reactor, configuration of heat transfer flow, discharge of dissolved gas out of the module and mixing of fluids.

Problems often arising with construction of flow modules include leakage and soiling of dead ends and crevices formed when said fittings are mounted in the port holes of the module. Flow modules are generally described in the international patent applications PCT/SE2010/050397, WO 2007/050013 and WO 2007/073281.

SUMMARY

There is disclosed herein a port fitting which reduces the disadvantages of the problems mentioned above. A further advantage of the present invention is that the flow of fluids within the flow channel of a flow module may be able to rinse and clean the port fittings or port fitting equipments, inlets, outlets etc. which is inserted in the flow module port holes during use of the flow module, and thus may provide a hygienic sealed flow module. Hygienic sealing could be crucial in several applications such as in production of pharmaceuticals and food applications.

The present invention includes a port fitting having a head, and a shaft with a centre axis. Attached to the head of the port fitting is the shaft, and the shaft has a first and a second end portion. The port fitting includes a fastening element at the first end portion of the shaft for fastening the port fitting to the flow module or flow plate, and the port fitting comprises further a seal arranged either externally on the shaft, or the seal is arranged at the second end portion facing away from the head, or the seal is arranged in the short side of the second end portion. In one embodiment, the seal is sealing port hole together with port fitting from the fluids flowing in flow channel. The port fitting of the invention is to be inserted in port hole in a flow module, which port hole is in communication with a flow channel.

The flow module, according to the invention, is any type of module having a channel for fluids flowing within the channel. For example, the flow module may be a plate reactor, a tube reactor, a heat exchanger reactor, a heat exchanger, or any other type of module having a channel for fluids which channel is connected to the port fittings via the port holes. In one embodiment, the flow module is a contactor, a mixing module, i.e. the invention is not limited to a specific type of flow module. A flow module could be built up by plates or tubes or any other form of flow units as long as the flow module has at least one channel. The port fittings of the invention could be fitted into the port holes of a flow module, and the port holes may be placed along the sides of the flow module, i.e. in case of channel plates the port holes could be on the sides of each plate or in case of channels in tubes the port holes could be connected in radial direction of the tubes.

In another embodiment of the present invention the seal is a ring-formed seal arranged in a ring-formed groove either externally on the shaft at the second end portion facing away from the head, or in the short side of the second end portion, and protruding from said groove.

In another embodiment of the present invention the ring-formed groove is arranged in a tapered or rounded part of the second end portion closest to the tip.

In yet another embodiment of the present invention the seal is a ferrule.

In yet another embodiment of the present invention said fastening element is a set of threads attached to the head, or the fastening element is having a hole for the head and holes for fastening means for fastening the port fitting to the port hole in a flow module or in a flow plate. The fastening means according to the invention could any type fastening means, such as screws etc.

In yet another embodiment of the present invention the port fitting has a central boring through the whole length of said port fitting aligned with said axis.

In another embodiment of the present invention may the boring have an inlet, an outlet or a nozzle mounted, or in the boring could a sensor unit, a thermo couple, a spring-loaded sensor or a resistance thermometer be mounted.

In another embodiment of the present invention the port fitting has a central boring aligned with said axis leading through the head and the shaft to the second end portion but not opening up said boring in the second end instead leaving a thin wall of material.

In another embodiment of the present invention a sensor unit, a thermo couple, a spring-loaded sensor or a resistance thermometer could be mounted in the boring.

Other aspects and advantages of the invention will, with reference to the accompanying drawings, be presented in the following detailed description of embodiment s of the invention. The below figures are intended to illustrate the invention and not to limiting the scope of invention.

DESCRIPTION OF PREFERRED EMBODIMENTS OF THE INVENTION

Figure 1:
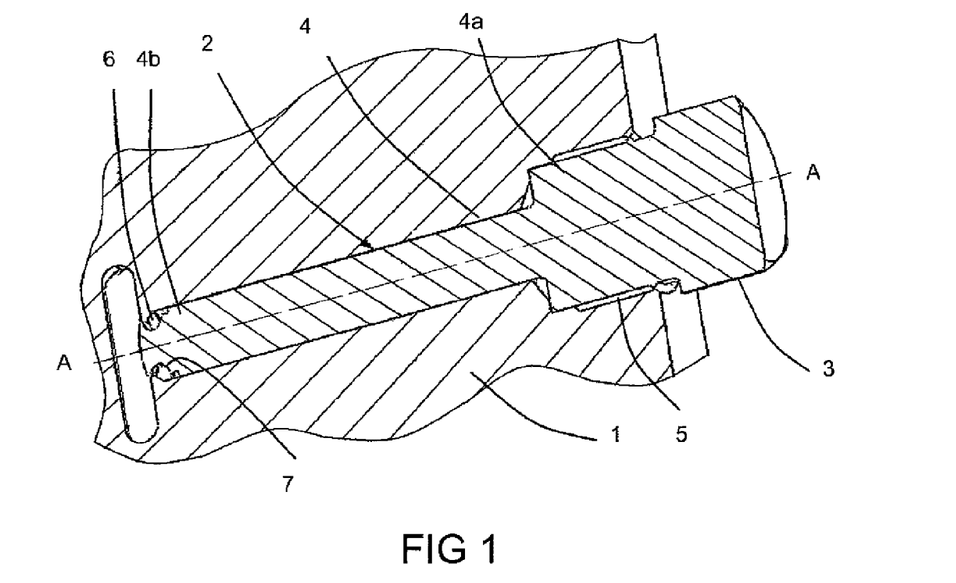
FIG. 1 discloses a flow module port fitting according to the present invention adapted to be mounted in a port hole of a flow module.

In FIG. 1 is an example of a port fitting depicted, which has, when mounted, the function of blocking a port hole communicating with the inside of a flow module. Said port fitting 2 comprises a head 3 which has a hexagonal form for facilitating application of said port fitting 2 in a port hole of a flow module 1.

A shaft 4 having a circular cross section extends from the head 3 along a central axis A-A. The shaft 4 includes a first portion 4a extending from the head 3. The first portion 4a includes a set of threads 5 (e.g., a threaded area) arranged thereon and adapted to be screwed into a complimentary set of threads in a port hole of the flow module 1. A second portion 4b extends from the first portion 4a and terminates at a terminal end (e.g., free end or tip) thereof. The terminal end is slightly tapered or rounded. A ring-formed groove 7 (e.g., annular groove) is arranged or formed in an envelope surface of the tapered or rounded part of the second portion 4b of the shaft 4 close to (e.g., proximate) the terminal end. The diameter of the cross section of the second portion 4b is smaller than a diameter of a corresponding portion of the port hole in the flow module A ring-formed (e.g., annular) port seal 6 of O-ring-type is arranged in the groove 7. The port seal 6 may have other cross-sections, e.g. oval or rectangular.

The diameter or the width of the cross-section is larger than the depth of the groove 7 thus causing the seal to protrude from said envelope surface.

When fitted in a port hole of a flow module as is disclosed in FIG. 1 the protruding seal 6 rests against a ring-formed lip in said port hole and thus seals any gaps between the assembly and the port hole seen from the flow channel on the inside of the flow module. With the threaded fitting in the port hole a tight enough sealing function is provided for. The O-ring seal will be flushed with process fluid in the flow channel on the inside of the flow module.

Figure 2:
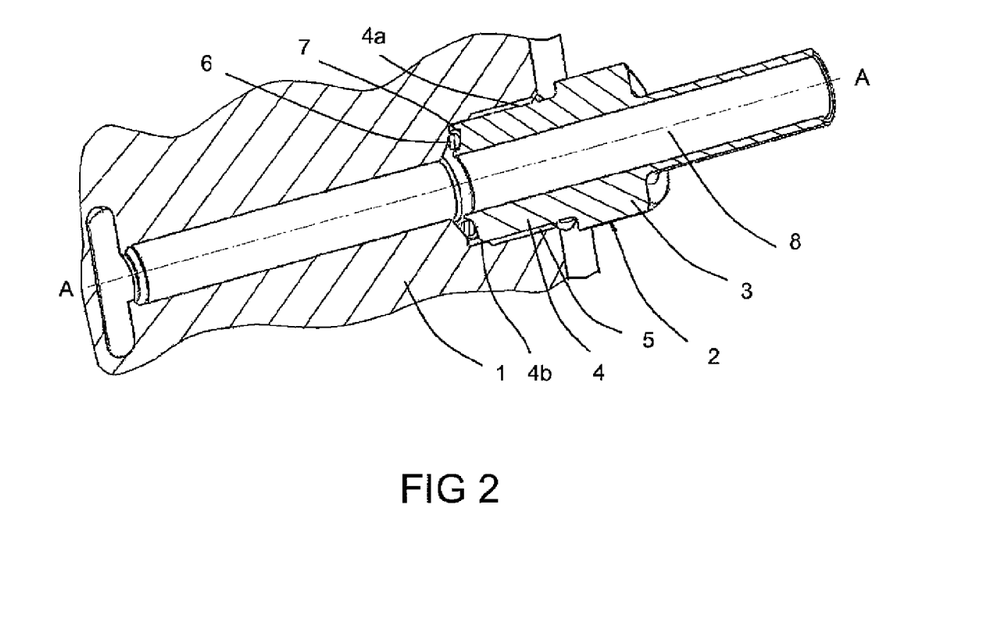
FIG. 2 discloses a flow module port fitting with an open boring according to the present invention adapted to provide the possibility to introduce or remove fluids or gases to or from said flow module or mount monitoring equipment etc.

In FIG. 2 is an example of a port fitting depicted, which has, when fitted, the function of introduce or remove fluids or gases to or from said flow module. Said port fitting 2 comprises a head 3 which has a hexagonal form for facilitating application of said port fitting 2 in a port hole of a flow module 1.

As shown in FIG. 2, the first portion 4a extends from the head 3 of the shaft 4. The shaft 4 has a circular cross section and a central axis A-A. At said first portion 4a (e.g., short portion) a set of threads 5 is arranged adapted to be screwed into a complimentary set of threads in a port hole of said flow module 1. A second portion 4b of said shaft 4 extends from the first portion 4a and terminates at a terminal end (e.g., free end) thereof. A ring-formed groove 7 (e.g., annular groove) is formed in the an end surface of the first portion 4a. in a short end surface of the of the shaft 4. In said ring-formed groove 7 a ring-formed port seal 6 of O-ring-type is arranged. Said port seal 6 may have other cross-sections, e.g. oval or rectangular.

The diameter or the width of the cross-section is larger than the depth of the groove 7 thus causing the seal to protrude from said short end surface.

The port fitting 2 has a central boring 8 through the whole length of said port fitting aligned with said axis A-A and thus providing a channel through which substances may be introduced into or removed from the interior of said flow module.

When fitted in a port hole of a flow module as is disclosed in FIG. 2 the protruding port seal 6 rests against a ring-formed surface of said port hole where the said portion of smaller diameter starts and thus seals the port hole from the inside of the flow module. With the threaded port fitting in the port hole a tight enough sealing function is provided.

Figure 3:
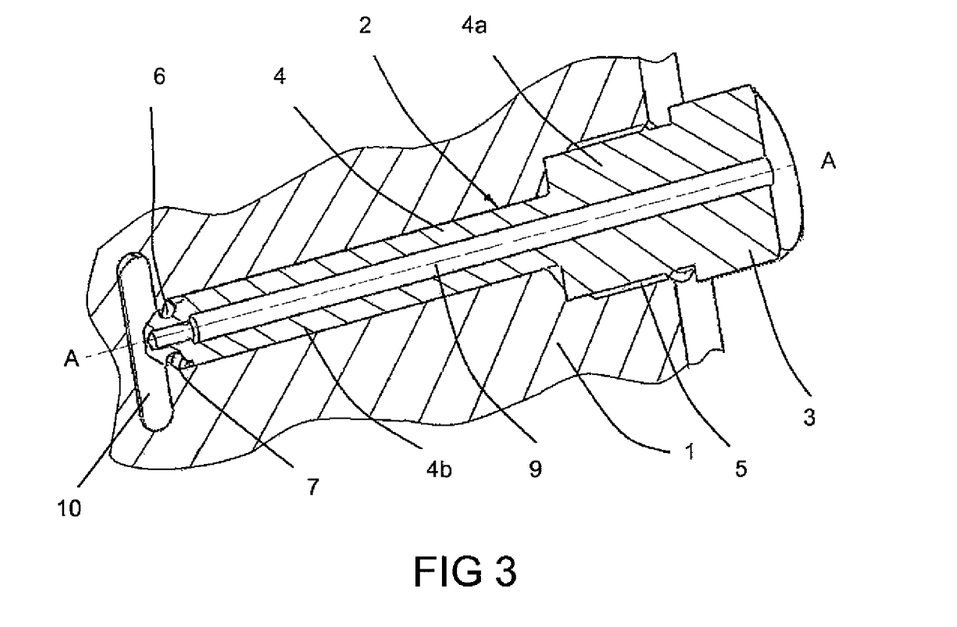
FIG. 3 discloses a flow module port fitting with a closed boring according to the present invention adapted to provide the possibility to arrange equipment such as sensors in said flow module.

In FIG. 3 is an example of a port fitting 2 depicted, which has, when fitted, the function of providing the possibility to arrange sensors in said flow module. Said port fitting 2 comprises a head 3 which has a hexagonal form for facilitating application of said port fitting 2 in a port hole of a flow module 1.

To the head 3 is a first end 4a of a shaft 4 attached which shaft 4 has a circular cross section. At said first end portion 4a a set of threads 5 is arranged adapted to be screwed into a complimentary set of threads in a port hole of said flow module 1. A second end portion 4b of said shaft 4 is free and the part closest to the end it is slightly tapered towards the tip. A ring-formed groove 7 is arranged in the envelope surface of said tapered part of the end portion 4b of the shaft 4 close to said second end. The diameter of the cross section of said second end portion 4b is smaller corresponding to a portion of said port hole in the flow module also with smaller diameter. In said ring-formed groove 7 is a ring-formed seal 6 of O-ring-type arranged. Said seal 6 may have other cross-sections, e.g. oval or rectangular.

The diameter or the width of the cross-section of the seal 6 is larger than the depth of the groove 7 thus causing the seal to protrude from said envelope surface.

When fitted in a port hole of a flow module as is disclosed in FIG. 3 the protruding seal 6 rests against a ring-formed lip in said port hole and thus seals the gap between the port fitting and the port hole from the inside of the flow module. With the threaded port fitting in the port hole a tight enough sealing function is provided.

The port fitting 2 has a central boring 9 aligned with said axis A-A leading through the head 3 and the shaft 4 to the free end but not opening up said boring 9 in said second end instead leaving a thin wall of material. This boring 9 may then be used for mounting sensors e.g. temperature sensors. For facilitating the mounting of such sensors the boring 9 may in its end with the head 3 have interior threads complimenting exterior threads on a sensor arrangement. Such a sensor may be provided with a coaxial spring, preferably a coil spring, arranged against a stop constituted by the bottom of a head of the sensor which head is formed as a bolt or screw head and used to screw the sensor in place in the boring 9. The spring is thus brought against a stop formed in the boring 9, e.g. a beginning of a part with smaller diameter. The sensor when mounted in the boring is thus spring-loaded.

Figure 4:
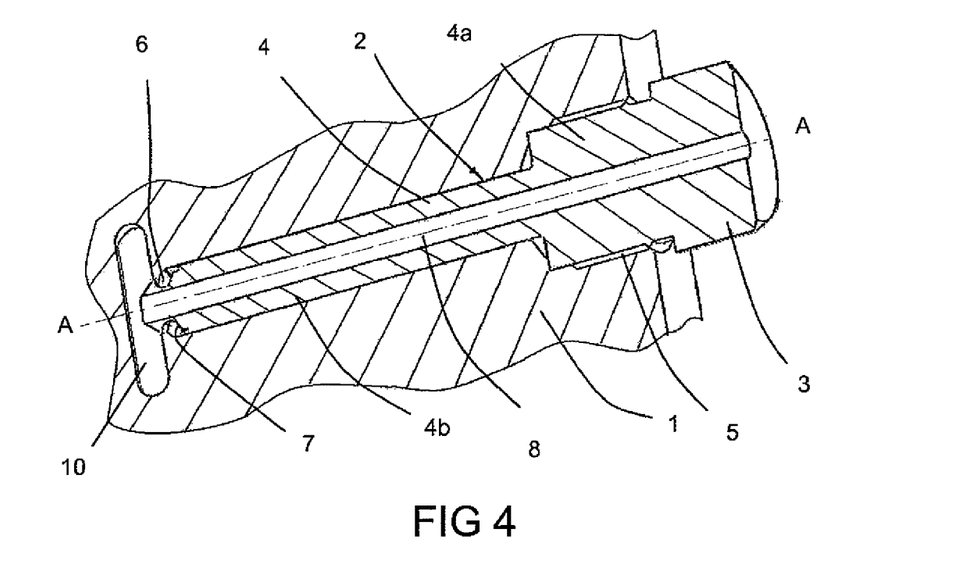
FIG. 4 discloses a flow module port fitting according to the present invention adapted to provide the possibility to introduce or remove fluids or gases to or from said flow module or mount monitoring equipment etc.

In FIG. 4 is an example of a port fitting depicted, which has, when fitted, the function of introducing or removing fluids or gases to or from said flow module or the function of providing the possibility to arrange sensors in said flow module. Said port fitting 2 comprises a head 3 which has a hexagonal form for facilitating application of said port fitting 2 in a port hole of a flow module 1.

To the head 3 is a first end 4a of a shaft 4 attached which shaft 4 has a circular cross section. At said first end portion 4a a set of threads 5 is arranged adapted to be screwed into a complimentary set of threads in a port hole of said flow module 1. A second end portion 4b of said shaft 4 is free and the part closest to the end it is slightly tapered towards the tip. A ring-formed groove 7 is arranged in the envelope surface of said tapered part of the end portion 4b of the shaft 4 close to said second end. In said ring-formed groove 7 is a ring-formed seal 6 of O-ring-type arranged. Said seal 6 may have other cross-sections, e.g. oval or rectangular if the cross-section of the port hole has that form.

When fitted in a port hole of a flow module as is disclosed in FIG. 4 the protruding seal 6 rests against a ring-formed lip in said port hole and thus seals the gap between the port fitting and the port hole from the inside of the flow module. With the threaded port fitting in the port hole a tight enough sealing function is provided.

The port fitting 2 has a central boring 8 through the whole length of said port fitting aligned with said axis A-A and thus providing a channel through which substances may be introduced into or removed from the interior of said flow module. This boring 8 may also be used for mounting sensors for example temperature sensors. For facilitating the mounting of such sensors the boring 8 may in its end with the head 3 have interior threads complimenting exterior threads on a sensor arrangement. Such a sensor may be provided with a coaxial spring, preferably a coil spring, arranged against a stop constituted by the bottom of a head of the sensor which head is formed as a bolt or screw head and used to screw the sensor in place in the boring 8.

Figure 5:
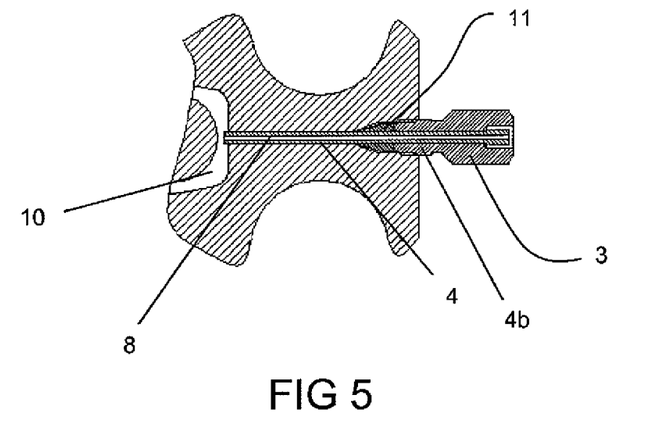
FIG. 5 discloses a flow module port fitting according to the present invention adapted to provide the possibility to introduce or remove fluids or gases to or from said flow module.

In FIG. 5 is an example of a port fitting depicted, which has, when fitted, the function of introduce or remove fluids or gases to or from said flow module or the function of providing the possibility to arrange sensors in said flow module. Said port fitting 2 comprises a head 3 which has a hexagonal form for facilitating application of said port fitting 2 in a port hole of a flow module 1.

At the second end portion 4b of said shaft 4 is a ferrule 11 attached for sealing said port fitting 2 in a port hole of a flow module 1 having a channel 10. The port fitting 2 has also a central boring 8 through the whole length of said port fitting aligned with shaft 4.

Figure 6:
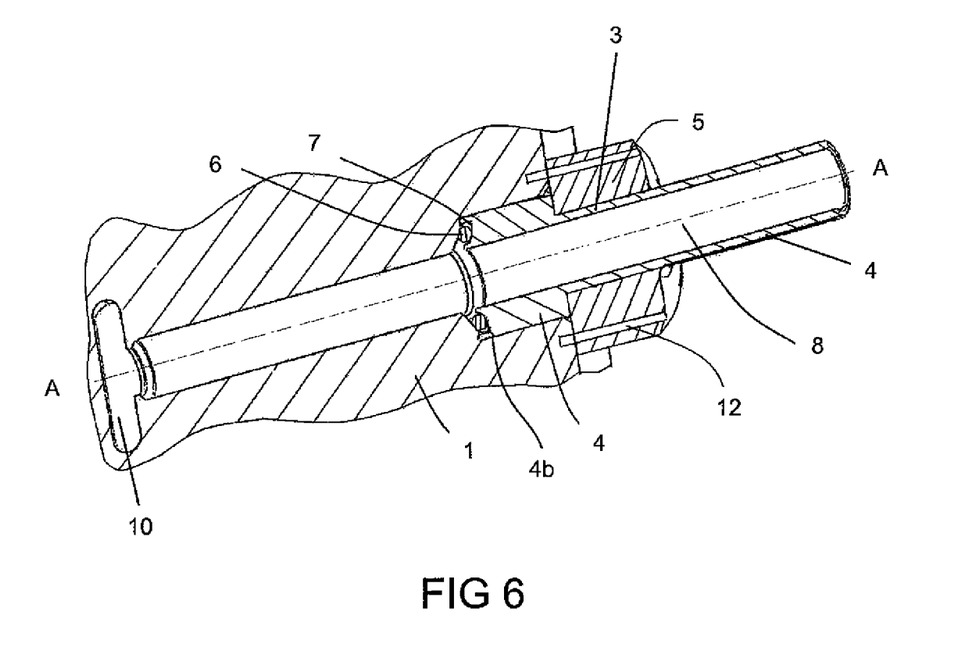
FIG. 6 discloses a flow module port fitting according to the present invention adapted to provide the possibility to introduce or remove fluids or gases to or from said flow module.

In FIG. 6 is an example of a port fitting depicted, which has, when fitted, the function of introducing or removing fluids or gases to or from said flow module, but also sensors can be mounted in the port fitting for monitoring of the process within the flow module.

To the head 3 is a first end 4a of a shaft 4 attached which shaft 4 has a circular cross section and a central axis A-A. The outer diameter of head 3 is smaller than the outer diameter of shaft 4. A second end portion 4b of said shaft 4 is free and there is a ring-formed groove 7 in the short end surface of the shaft 4. In said ring-formed groove 7 a ring-formed port seal 6 of O-ring-type is arranged. Said port seal 6 may have other cross-sections, e.g. oval or rectangular.

The diameter or the width of the cross-section is larger than the depth of the groove 7 thus causing the seal to protrude from said short end surface.

The port fitting 2 has a central boring 8 through the whole length of said port fitting aligned with said axis A-A and thus providing a channel through which substances may be introduced into or removed from the interior of said flow module.

When fitted in a port hole of a flow module as is disclosed in FIG. 6 the protruding port seal 6 rests against a ring-formed surface of said port hole where the said portion of smaller diameter starts and thus seals the port hole from the inside of the flow module. With the threaded port fitting in the port hole a tight enough sealing function is provided.

When fitted in a port hole of a flow module fastening element 5, which has a hole for head 3, is thread on head 3. Fastening element 5 also has holes 12 for fastening the port fitting to the port hole. In holes 12 fastening means may be inserted for fastening said port fitting 2 to the port hole in flow module 1 or in flow plate 13. The fastening means could be any kind of fastening means such as screws etc.

Figure 7:
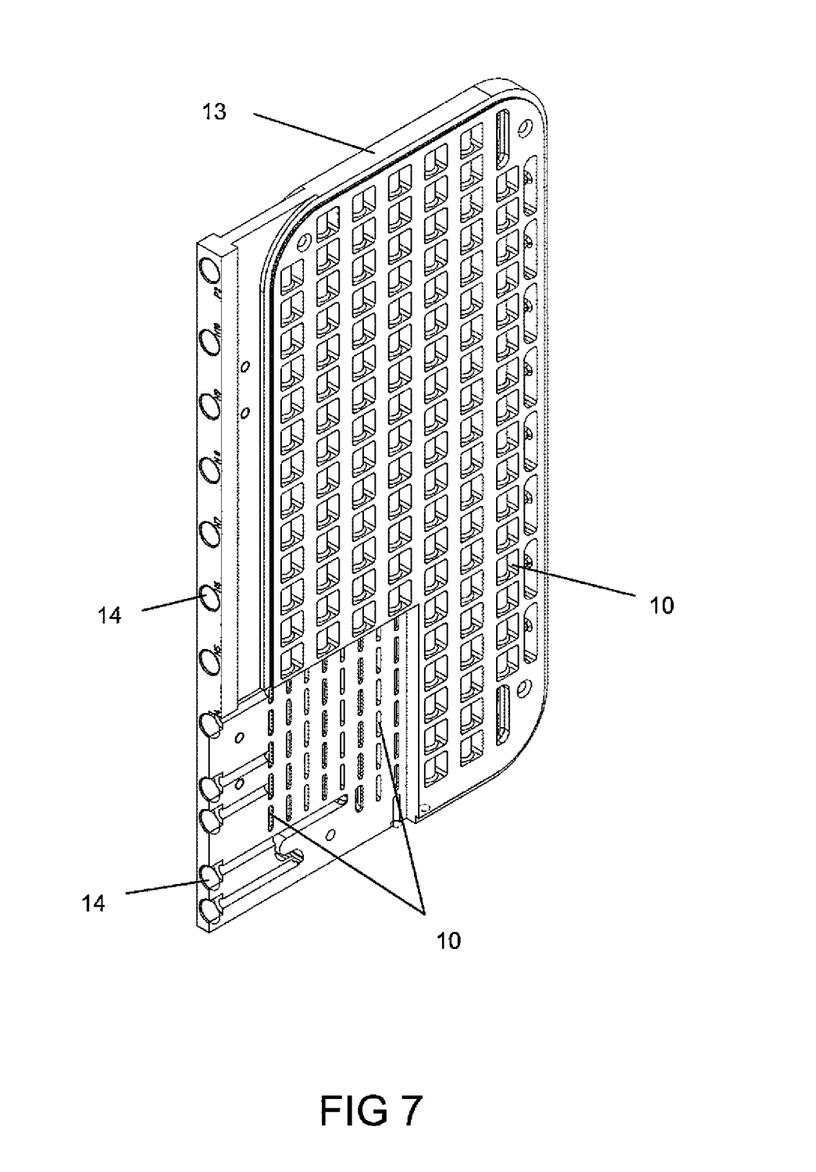
FIG. 7 discloses a flow plate with port holes and a channel.

In FIG. 7 is an example of a flow plate 13 or a channel plate 13 of a flow module 1 depicted, which has, a channel 10 for fluids which could be a process fluid together with additional additives such as different solvents, different reactants, gases etc. A flow plate 13 or a channel plate 13 could have several port holes 14 for access to channel 10 each port hole 14 for different purposes or the same purpose depending on the application.

The flow module of the invention could be a plate reactor, a tube reactor, a heat exchanger reactor, a heat exchanger, or any other type of module having a channel 10 for fluids which channel is connected to port fittings 2 via port holes 14. The port fittings may either be plugged or equipped with different equipments, i.e. the port fitting may have an open boring, a closed boring or the port fitting may have no boring at all. The equipment, which may be introduced via the boring through the ports fittings to the channel of a flow module, could be of any kind which would monitor the process in the flow module. The equipment may be selected from the group consisting of inlets for reactants, inlets for additional fluids, outlets for process fluids, outlets for intermediate products to be fed into the channel at a later stage, outlets for test samples, injection nozzles, inlet dispersers, security devices for pressure release instant or controlled, sensor units, thermo couples, resistance thermometers. The ports fittings can have means for injection of fluids, reactants etc. such as for example a nozzle that can introduce additional fluids, re-mixing fluids, re-dispersion fluids etc. at a chosen location of the channel. A mix or a dispersion need sometime to be re-mixed or re-dispersed after some holding time, then it can be suitable to inject the mix or the dispersion again into the channel, and the injection can be done with any kind of suitable nozzle. The nozzles, which are inserted through the port fittings, can be selected form any suitable nozzle and examples of nozzles are injection nozzles, dispersion nozzles, re-dispersion nozzles, re-mixing nozzles, coaxial nozzles, tube nozzles etc. A coaxial nozzle could be defined as a nozzle with two or more tubes arranged within each other, that a larger tube having a large radius is surrounding a smaller tube having a smaller radius. When such a nozzle is used two or more fluids can be mixed or form dispersions. A re-mixing nozzle could be a tube nozzle having a hole with a nozzle head and the hole has a smaller radius than the tube. The nozzle may be a dispersion nozzle which can have one or more holes at the outlet of the dispersion nozzle and the holes can be arranged in concentric circles or the holes can be arranged in other suitable patterns.

The above detailed description is not limited to the mentioned embodiments of the invention but to a person skilled in the art there are several modifications possible within the scope of the claimed invention.

The invention claimed is:

1. A port fitting for insertion in a port hole in a flow module or flow plate, the port fitting comprising:
   a head configured to extend outwardly from the port hole;
   a shaft having a central axis, the shaft extending from the head to a terminal end of the shaft and being configured to extend axially into a flow channel in fluid communication with the port hole;

the shaft defining a first portion and a second portion located radially inward from the first portion, the first portion defining a fastening element thereon for fastening the port fitting in the port hole, the first portion defining a first portion diameter extending axially inward from the fastening element and corresponding to a first port hole diameter, the second portion defining a second portion diameter extending axially inward from the first portion corresponding to a second port hole diameter, the second portion diameter being less than the first portion diameter thereby forming a first portion annular lip positioned against a corresponding port hole annular lip, the second portion terminating in a second end defining one of a tapered tip or an arcuate tip, the second end of the second end portion defining a free axial end of the shaft;

an annular groove formed in the second end of the second portion, the groove facing axially away from the head and the groove defining an axial depth;

an annular seal arranged in the groove radially inward from an exterior surface of the second end of the second portion, the seal having a cross sectional diameter that is of a greater magnitude than the axial depth of the groove, so that a portion of the seal protrudes from said groove and the terminal end extending axially inwardly into the port hole beyond the annular groove; and the seal together with the port fitting being configured to seal the port hole from fluids flowing in the flow channel.

2. The port fitting according to claim 1, wherein the annular groove is arranged in one of:
a tapered portion of the second portion proximate the tapered terminal end; and
an arcuate portion of the second portion proximate the arcuate terminal end.

3. The port fitting according to claim 1, wherein the seal is a ferrule.

4. The port fitting according to claim 1, wherein said fastening element comprises one of:
a threaded area on the first portion; and
holes in the head for receiving a fastening element.

5. The port fitting according to claim 1, wherein said port fitting has a central bore extending an entire length of said port fitting aligned with said axis.

6. The port fitting according to claim 5, wherein the bore has one of:
an inlet mounted thereto;
an outlet mounted thereto;
a nozzle mounted thereto;
a sensor unit disposed therein;
a thermocouple disposed therein;
a spring loaded sensor disposed therein; and
a resistance thermometer disposed therein.

7. The port fitting according claim 1, wherein said port fitting has a central bore aligned with said axis extending through the shaft and terminating a distance from the terminal end.

8. The port fitting according to claim 7, wherein one of a sensor unit, a thermo couple, a spring-loaded sensor and a resistance thermometer is mounted in said bore.

9. A port fitting for insertion in a port hole in a flow module or flow plate, the port fitting comprising:
a head configured to extend outwardly from the port hole;
a shaft having a central axis, the shaft extending from the head to a terminal end of the shaft and being configured to extend into the port hole;
the shaft defining a first portion and a second portion located radially inward from the first portion, the first portion defining a first end proximate the head and a second end defining an axial end of the first portion and terminating at a first end of the second portion, the first portion defining a fastening element thereon for fastening the port fitting in the port hole, the first portion defining a first portion diameter extending axially inward from the fastening element and corresponding to a first port hole diameter, the second portion defining a second portion diameter extending axially inward from the first portion corresponding to a second port hole diameter, the second portion diameter being less than the first portion diameter thereby forming a first portion annular lip positioned against a corresponding port hole annular lip, the second portion terminating in a second end defining one of a tapered tip or an arcuate tip, the second end of the second end portion defining a free axial end of the shaft;

an annular groove formed in the second end of the first portion, the groove facing axially away from the head and the groove defining an axial depth;

an annular seal arranged in the groove radially inward from an exterior surface of the second end of the first portion, the seal having a cross sectional diameter that is of a greater magnitude than the axial depth of the groove, so that a portion of the seal protrudes from said groove and the second end of the first portion extending axially inwardly into the port hole beyond the annular groove; and the seal together with the port fitting being configured to seal the port hole from fluids flowing in a flow channel.

10. A flow module for a reactor, the flow module comprising:
a flow plate defining a front face and a periphery;
one or more flow channels extending longitudinally within the flow plate;
a plurality of port holes extending through the front face and into the flow plate substantially orthogonal to the one or more flow channels, each of the plurality of port holes being in fluid communication with at least one of the one or more flow channels; and
a plurality of port fittings configured for insertion in a respective one of the plurality of port holes, each of the plurality of port fittings comprising:
a head configured to extend outwardly from the port hole;
a shaft having a central axis, the shaft extending from the head to a terminal end of the shaft and being configured to extend into the port hole;
the shaft defining a first portion and a second portion located radially inward from the first portion, the first portion defining a first end proximate the head and a second end defining an axial end of the first portion and terminating at a first end of the second portion, the first portion defining a fastening element thereon for fastening the port fitting in the port hole, the first portion defining a first portion diameter extending axially inward from the fastening element and corresponding to a first port hole diameter, the second portion defining a second portion diameter extending axially inward from the first portion corresponding to a second port hole diameter, the second portion diameter being less than the first portion diameter thereby forming a first portion annular lip positioned against a corresponding port hole annular lip, the second portion terminating in a second end defining one of a tapered tip or an arcuate tip, the second end of the second end portion defining a free axial end of the shaft;

an annular groove formed in one of the first portion second end and the second portion second end, the groove facing axially away from the head and the groove defining an axial depth;

an annular seal arranged in the groove radially inward from an exterior surface of the second end of the second portion, the seal having a cross sectional diameter that is of a greater magnitude than the axial depth of the groove, so that a portion of the seal protrudes from said groove and the terminal end extending axially inwardly into the port hole beyond the annular groove;

the seal together with the port fitting being configured to seal the port hole from fluids flowing in the at least one of the one or more flow channels; and a central bore extending an entire length of at least one port fitting aligned with the shaft central axis and in fluid communication with the at least one of the one or more flow channels, the bore having one of: an inlet mounted thereto, an outlet mounted thereto, a nozzle mounted thereto, a sensor unit disposed therein, a thermocouple disposed therein, a spring loaded sensor disposed therein, and a resistance thermometer disposed therein.

* * * * *